(12) United States Patent
Zha

(10) Patent No.: US 11,256,121 B2
(45) Date of Patent: Feb. 22, 2022

(54) LIQUID CRYSTAL DISPLAY DEVICE FOR UNDER-SCREEN IDENTIFICATION SCHEME

(71) Applicant: Wuhan China Star Optoelectronics Technology Co., Ltd., Wuhan (CN)

(72) Inventor: Guowei Zha, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 239 days.

(21) Appl. No.: 16/631,170

(22) PCT Filed: Oct. 24, 2019

(86) PCT No.: PCT/CN2019/112954
§ 371 (c)(1),
(2) Date: Jan. 15, 2020

(87) PCT Pub. No.: WO2020/248467
PCT Pub. Date: Dec. 17, 2020

(65) Prior Publication Data
US 2021/0356788 A1    Nov. 18, 2021

(30) Foreign Application Priority Data
Jun. 10, 2019   (CN) .......................... 201910496520.9

(51) Int. Cl.
*G02F 1/1333* (2006.01)
*G06K 9/00* (2006.01)
*G02F 1/1335* (2006.01)
*G02F 1/13357* (2006.01)

(52) U.S. Cl.
CPC .... *G02F 1/13338* (2013.01); *G02F 1/133514* (2013.01); *G02F 1/133528* (2013.01); *G02F 1/133603* (2013.01); *G06K 9/0004* (2013.01)

(58) Field of Classification Search
CPC ........... G02F 1/13338; G02F 1/133514; G02F 1/133528; G02F 1/133603; G06K 9/0004
USPC ....................................................... 349/12
See application file for complete search history.

(56) References Cited

U.S. PATENT DOCUMENTS

| | | | | |
|---|---|---|---|---|
| 2017/0161543 A1* | 6/2017 | Smith | ................. | G06K 9/0004 |
| 2018/0012069 A1* | 1/2018 | Chung | ................. | G06K 9/2036 |
| 2019/0157337 A1* | 5/2019 | Lin | ................. | H01L 31/167 |
| 2019/0171050 A1* | 6/2019 | Chen | ................. | G02B 6/0076 |
| 2019/0310724 A1* | 10/2019 | Yeke Yazdandoost | | ................. G02F 1/13338 |

* cited by examiner

Primary Examiner — Charles S Chang

(57) ABSTRACT

The present invention provides a liquid crystal display (LCD) device for an under-screen identification scheme. The LCD device for the under-screen identification scheme comprises a liquid crystal module, a backlight module, an under-screen sensor, and a micro light emitting diode (LED) module. The liquid crystal module defines a liquid crystal module operable region and a digging region adjacent to the liquid crystal module operable region. Therefore, there is no display interruption and discontinuous boundaries in the vision, and can achieve a complete full-screen design.

10 Claims, 3 Drawing Sheets

LIQUID CRYSTAL DISPLAY DEVICE FOR UNDER-SCREEN IDENTIFICATION SCHEME

RELATED APPLICATIONS

This application is a National Phase of PCT Patent Application No. PCT/CN2019/112954 having International filing date of Oct. 24, 2019, which claims the benefit of priority of Chinese Patent Application No. 201910496520.9 filed on Jun. 10, 2019. The contents of the above applications are all incorporated by reference as if fully set forth herein in their entirety.

FIELD AND BACKGROUND OF THE INVENTION

The present invention relates to the field of liquid crystal display (LCD) devices, and in particular, to an LCD device for an under-screen identification scheme.

BACKGROUND OF INVENTION

In the field of small and medium size displays, full-screen technologies have become a current focus of research and development. In other words, how to maximize a screen ratio of a human-computer interaction interface through development of related technologies is the current focus of research and development.

The first generation of full-screen technologies mainly focused on a screen size ratio that changed from 16:9 to 18+:9. The second generation of the full-screen technologies further compress top, bottom, left, and right borders of a screen, and even use flexible folding technologies to maximize viewing areas. Another full-screen technology trend is how to further integrate fingerprint recognition, cameras, face recognition, distance sensing, and other sensors of display terminals into active areas of a display screen, so that the display screens gradually transition from a simple display interface to a comprehensive sensing and interactive interface.

Current mainstream display technologies comprise liquid crystal displays (LCDs) and organic light emitting diodes (OLEDs). The LCDs are passive light emitting technologies, and a light and dark control of light is realized by illuminating liquid crystal cells through an entire backlight structure. The OLED technologies use active illuminating of OLED pixels one by one, which have advantages such as high contrast, thin, flexible, and foldable.

On the other hand, based on non-backlight characteristics of the OLED, it is well compatible with current optical fingerprinting modules, and thus inward-facing optical fingerprint recognitions have become unique advantages of the OLED. At the same time, industries are also developing under-screen camera schemes based on the OLED, which can further switch between a display mode and an imaging mode, and thus have an advantage of there is no need to use current LCD digging schemes with digging areas that cannot be displayed.

The latest generation of display technologies is micro LEDs, which has similar active luminescence characteristics compared to OLED technologies. In addition, due to the stability and high efficiency of inorganic LEDs, they have advantages such as long life, high brightness, small size of control chips, and short response time, and have become one of the key developments of display industries. However, compared with traditional panel technologies with "subtraction manufacturing" methods by etching and the like, the micro LEDs mainly rely on "additive manufacturing" methods with mass-transfers, and have low technical maturity. Especially in the face of mass display pixel transfers, it has inherent process yield and cost challenges, so it is still difficult to become a truly mature display technology in short term.

Obviously, in view of above three display technologies, the OLEDs have obvious advantages in the full-screen technologies. The advantage of low cost in the LCDs is precarious in the demand for next-generation full-screen technologies based on an under-screen sensing.

Although the next generation of micro LED technologies has great advantages in the requirements of the full-screen technologies, the process still faces the problem of mass-transfers yield and high cost, so how to achieve better OLED solutions based on existing LCD technologies has become an important direction for the industries to explore.

SUMMARY OF THE INVENTION

In order to solve the above technical problems, an object of the present invention is to provide a liquid crystal display (LCD) device for an under-screen identification scheme, which can realize a transparent display by using a color filter bypass (CF-bypass) and without pixel circuits at a position of an under-screen sensor under a LCD panel, and using micro light emitting diode (LED) modules with small areas based on a transparent substrate for display in a stacking direction. The micro LED module utilizes red, green, and blue (RGB) three-color for display, and a coverage area of each of chips is smaller than an area of each of sub-pixels. In the area where there is no chip inside the sub-pixel, light can pass normally, so when the sub-pixels are turned on, a micro LED operable region of a micro LED module can realize normal display. Also, the micro LED operable region of the micro LED module can be used to capture an external image into the under-screen sensor at any time when the sub-pixels are turned off. In this way, various under-screen sensing schemes such as under-screen fingerprint recognition, under-screen camera, under-screen recognition, and screen distance sensing can be realized. In addition, the micro LED micro LED operable region module is seamlessly connected with a liquid crystal module operable region of a liquid crystal module, so that there is no display interruption and discontinuous boundaries in the vision (such as notches, holes, etc.), and can achieve a complete full-screen design. Moreover, since micro LEDs have characteristics of high brightness and long life, some sub-pixels of the micro LEDs can be used as functions such as a fill light and indicator light.

In order to achieve the above object, the present invention provides an LCD device for an under-screen identification scheme. The LCD device comprises a liquid crystal module, a backlight module, an under-screen sensor, and a micro LED module. The liquid crystal module comprises an array glass, a liquid crystal layer, a color filter, and a polarizer. The liquid crystal layer, the color filter, and the polarizer are sequentially disposed on the array glass, and the liquid crystal module defines a liquid crystal module operable region and a digging region adjacent to the liquid crystal module operable region. The backlight module is disposed under the liquid crystal module and emits light toward the liquid crystal module. The under-screen sensor is disposed in the backlight module with respect to the digging region of the liquid crystal module. The micro LED module is disposed in the digging region defined by the liquid crystal module. Wherein the micro LED module defines a micro LED operable region, and the micro LED operable region is adjacent to the liquid crystal module operable region.

In an embodiment of the present invention, the micro LED module comprises a transparent substrate, a plurality of sub-pixels, and a plurality of chips, and the plurality of sub-pixels and the plurality of chips are disposed on the transparent substrate.

In an embodiment of the present invention, the chip of the micro LED module has a size ranging from 1 to 500 micrometers (μm), and the sub-pixel of the micro LED module has a size ranging from 10 to 1000 μm.

In an embodiment of the present invention, a coverage area of each of the chips is smaller than an area of each of the sub-pixels.

In an embodiment of the present invention, the under-screen sensor comprises a fingerprint recognition, a camera, a structured light sensor, a time-of-flight ranging sensor, a distance sensor, and a light sensor.

In an embodiment of the present invention, the micro LED module utilizes red, green, and blue (RGB) three-color display.

In an embodiment of the present invention, the micro LED operable region is disposed at a position comprising one of a hole, a water droplet, a notch, and an outward-facing of the liquid crystal module.

In an embodiment of the present invention, the area of the micro LED operable region is less than 10*10 mm.

In an embodiment of the present invention, the substrate of the micro LED module is driven by a passive matrix (PM) method or an active matrix (AM) method.

In an embodiment of the present invention, a vertical stack of the micro LED module comprises one of a built-in structure, a surface embedded structure, and a plug-in structure.

In order to make the above description of the present invention more comprehensible, preferred embodiments are described below, and drawings are described in detail below.

DESCRIPTION OF SPECIFIC EMBODIMENTS OF THE INVENTION

Figure 1:
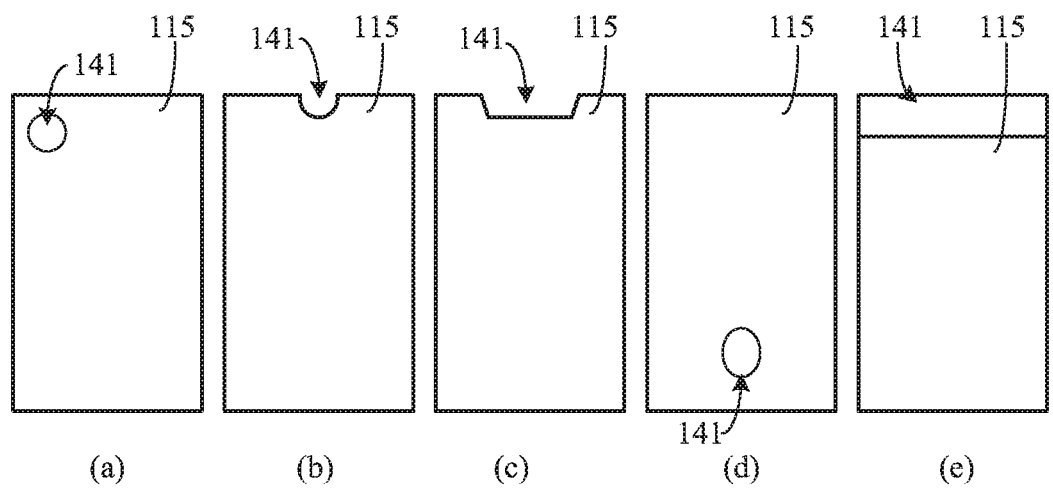
FIG. 1(a) to FIG. 1(e) are diagrams showing a set position of a micro light emitting diode (LED) operable region of a liquid crystal display (LCD) device for an under-screen identification scheme according to the present invention.

In order to make the above description of the present invention more comprehensible, preferred embodiments are described below, and drawings are described in detail below. Furthermore, directional terms mentioned in the present invention, such as up, down, top, bottom, front, back, left, right, inner, outer, side, surrounding, center, horizontal, vertical, longitudinal, axial, radial, uppermost or lowermost, etc., only refer to the direction of the additional drawings. Therefore, the directional terms used are for the purpose of illustration and understanding of the invention.

In the figure, elements with similar structure are denoted by the same reference numerals.

As shown in FIG. 1 to FIG. 5, an object of the present invention is to provide a liquid crystal display (LCD) device 100 for an under-screen identification scheme, which can realize transparent display using color filter bypass (CF-bypass) and without pixel circuits at a position of an under-screen sensor under a LCD panel, and use micro light emitting diode (LED) modules 140 with small areas based on a transparent substrate for display in a stacking direction.

Figure 2:
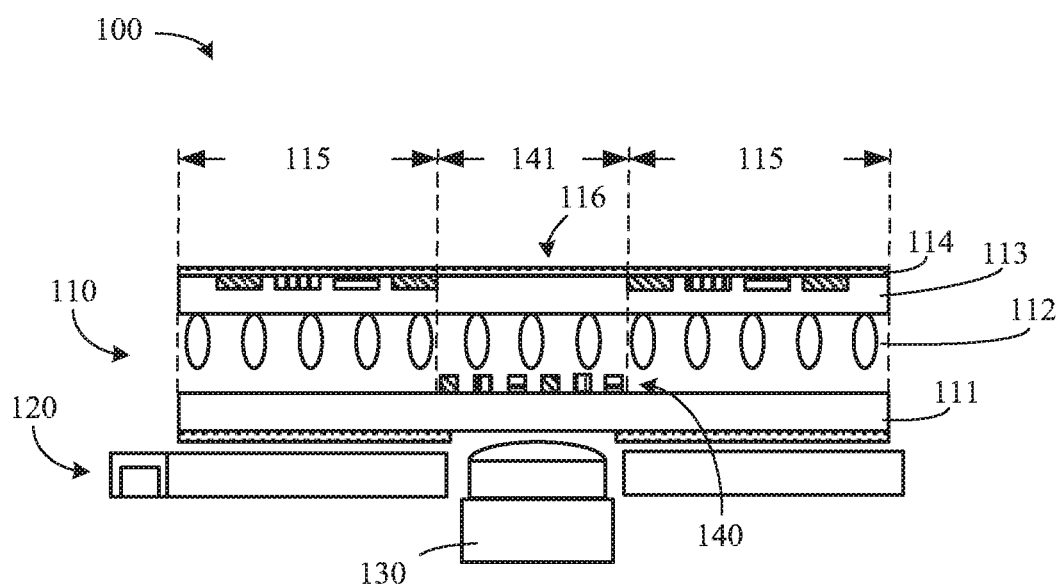
FIG. 2 shows a schematic diagram of the LCD device for the under-screen identification scheme according a first embodiment of the present invention.
Figure 3:
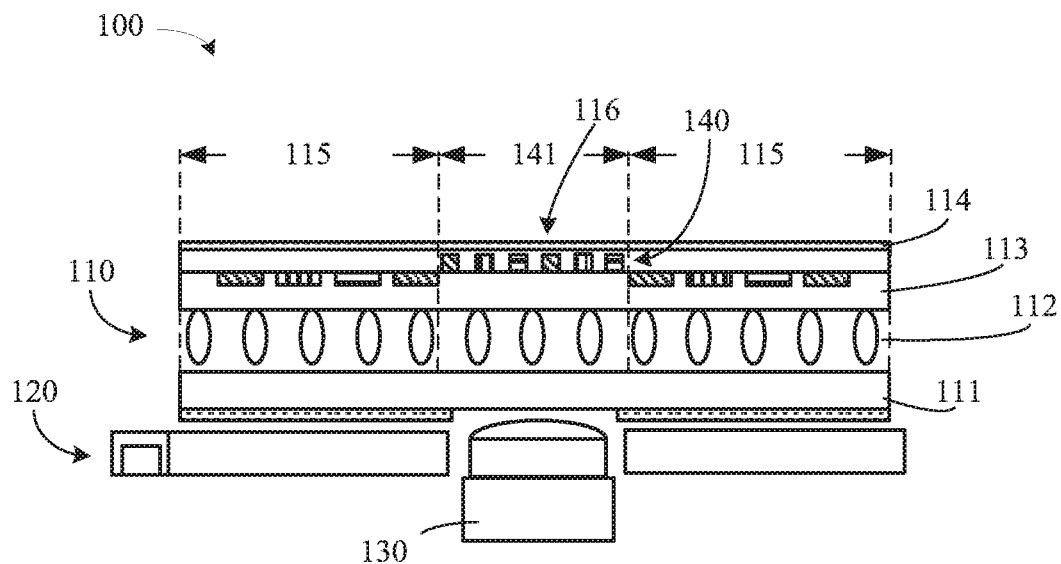
FIG. 3 shows a schematic diagram of the LCD device for the under-screen identification scheme according a second embodiment of the present invention
Figure 4:
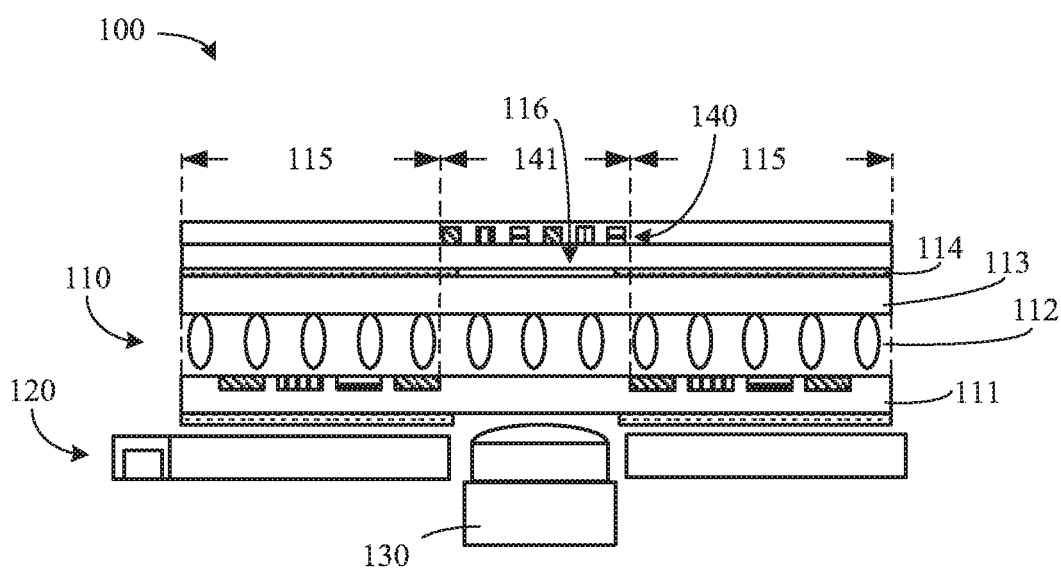
FIG. 4 shows a schematic diagram of the LCD device for the under-screen identification scheme according a third embodiment of the present invention.
Figure 5:
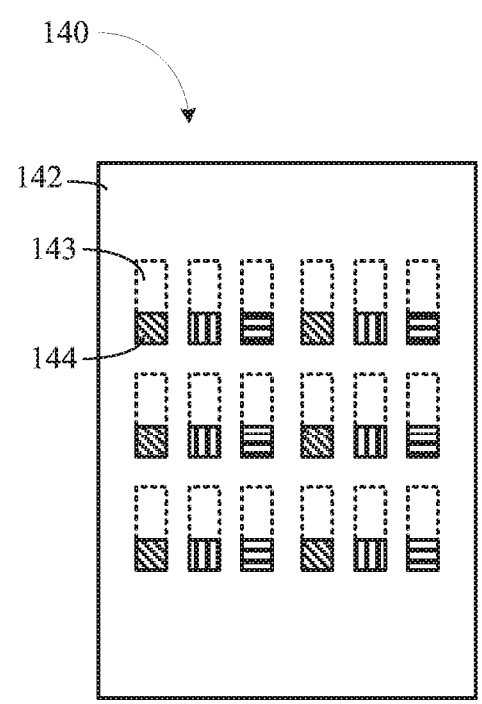
FIG. 5 is a schematic diagram showing a micro LED module of the LCD device for the under-screen identification scheme according to the present invention.

Referring to FIG. 5, the micro LED module 140 utilizes red, green, and blue (RGB) three-color for display, and a coverage area of each of chips 144 is smaller than an area of each of sub-pixels 143. In the areas where there is no chip 144 inside the sub-pixel 143, light can pass normally. Therefore, as shown in FIG. 2 to FIG. 4, when the sub-pixels 143 are turned on, the micro LED operable area 141 of the micro LED module 140 can realize normal display. At the same time, the micro LED operable area 141 of the micro LED module 140 can be used to capture an external image into the under-screen sensor by turning off the sub-pixels 143 at any time. In this way, various under-screen sensing schemes such as under-screen fingerprint recognition, under-screen camera, under-screen recognition, and screen distance sensing can be realized.

Please refer to FIG. 1(a) to FIG. 1(e). In the present invention, the micro LED operable area 141 of the micro LED module 140 is seamlessly connected with a liquid crystal module operable area 115 of a liquid crystal module 110. Therefore, there is no display interruption and discontinuous boundaries in the vision (such as notches, holes, etc.), and can achieve a complete full-screen design. Moreover, since micro LEDs have high brightness and long life characteristics, some sub-pixels 143 of the micro LEDs can be used as functions such as a fill light and indicator light.

In detail, FIG. 2 shows a schematic diagram of the LCD device for the under-screen identification scheme according a first embodiment of the present invention. The present invention provides the LCD device 100 for the under-screen identification scheme. The LCD device 100 comprises the liquid crystal module 110, a backlight module 120, an under-screen sensor 130, and the micro LED module 140.

The liquid crystal module 110 comprises an array glass 111, a liquid crystal layer 112, a color filter 113, and a polarizer 114. The liquid crystal layer 112, the color filter 113, and the polarizer 114 are sequentially disposed on the array glass 111. The liquid crystal module 110 defines the liquid crystal module operable region 115 and a digging region 116 adjacent to the liquid crystal module operable region 115.

The backlight module 120 is disposed under the liquid crystal module 110 and emits light toward the liquid crystal module 110. The under-screen sensor 130 is disposed in the backlight module 120 with respect to the digging region 116 of the liquid crystal module 110.

The micro LED module 140 is disposed in the digging region 116 defined by the liquid crystal module 110. In detail, the micro LED module 140 is disposed in the liquid crystal module 110 in an in-cell manner.

As shown in FIG. 2, the micro LED module 140 define a micro LED operable region 141, and the micro LED operable region 141 is adjacent to the liquid crystal module operable area 115 in a seamless manner, so that there is no display interruption and discontinuous boundaries in the vision.

As shown in FIG. 5, in the present invention, the micro LED module 140 comprises a transparent substrate 142, the plurality of sub-pixels 143, and the plurality of chips 144, and the plurality of sub-pixels 143 and the plurality of chips 144 are disposed on the transparent substrate 142. The chip 144 of the micro LED module 140 has a size ranging from 1 to 500 micrometers (μm), and the sub-pixel 143 of the micro LED module 140 has a size ranging from 10 to 1000 μm. In addition, a coverage area of each of the chips 144 is smaller than an area of each of the sub-pixels 143. Therefore, in the area where there is no chip 144 inside the sub-pixel 143, the light can pass normally. Therefore, when the sub-pixels 143 are turned on, the micro LED operable area 141 of the micro LED module 140 can realize normal display. At the same time, the micro LED operable area 141 of the micro LED module 140 can be used to capture the external image into the under-screen sensor by turning off the sub-pixels 143 at any time. In this way, various under-screen sensing schemes such as under-screen fingerprint recognition, under-screen camera, under-screen recognition, and screen distance sensing can be realized.

In the second embodiment as shown in FIG. 3, the micro LED module 140 is disposed on the liquid crystal module 110 in an on-cell manner. In addition, the mutual spatial relationship between the other components is the same as the first embodiment shown in FIG. 2. As a result, the micro LED operable area 141 is seamlessly connected to the liquid crystal module operable area 115 of the liquid crystal module 110, and thus there is no display interruption and discontinuous boundaries in the vision.

In the third embodiment as shown in FIG. 4, the micro LED module 140 is disposed in the liquid crystal module 110 in an add-on manner. In addition, the mutual spatial relationship between the other components is the same as the first embodiment shown in FIG. 2. As a result, the micro LED operable area 141 is seamlessly connected to the liquid crystal module operable area 115 of the liquid crystal module 110, and thus there is no display interruption and discontinuous boundaries in the vision.

In the present invention, the under-screen sensor 130 comprises a fingerprint recognition, a camera, a structured light sensor, a time-of-flight ranging sensor, a distance sensor, and a light sensor.

In the present invention, the micro LED module 140 utilizes red, green, and blue (RGB) three-color for display, but is not limited thereto.

As shown in FIG. 1(a) to FIG. 1(e), in the present invention, the micro LED operable region 141 is disposed at a position such as a hole (as shown in FIGS. 1(a) and 1(d)), a water droplet (as shown in FIG. 1(b)), a notch (as shown in FIG. 1(c)), and an outward-facing (as shown in FIG. 1(e)) of the liquid crystal module 110. In addition, the micro LED operable area 141 of the micro LED module 140 is seamlessly connected to the liquid crystal module operable area 115 of the liquid crystal module 110, and thus there is no display interruption and discontinuous boundaries in the vision, and can achieve a complete full-screen design.

In the embodiment of the present invention, the area of the micro LED operable region is less than 10*10 mm. Because the number of sub-pixels required for the aforementioned area is small, the transfer yield and cost control of the area can be ensured.

In the present invention, the substrate of the micro LED module 140 is driven by a passive matrix (PM) method or an active matrix (AM) method.

In summary, the micro LED module 140 of the LED device 100 for the under-screen identification scheme provided by the present invention utilizes red, green, and blue (RGB) three-color for display, and the coverage area of each of the chips 144 is smaller than the area of each of the sub-pixels 143. Thus, in the area where there is no chip 144 inside the sub-pixel 143, the light can pass normally, so when the sub-pixels 143 are turned on, the micro LED operable region of the micro LED module can realize normal display. Also, the micro LED operable region of the micro LED module can be used to capture the external image into the under-screen sensor at any time when the sub-pixels are turned off. In this way, various under-screen sensing schemes such as under-screen fingerprint recognition, under-screen camera, under-screen recognition, and screen distance sensing can be easily realized, thereby avoiding the high manufacturing cost when using OLED.

The present invention has been shown and described with respect to one or more implementations, and equivalents and modifications will be apparent to those skilled in the art. The present invention includes all such modifications and variations and is only limited by the scope of the appended claims. With particular regard to the various functions performed by the above-described components, the terms used to describe such components are intended to correspond to any component that performs the specified function of the component (eg, which is functionally equivalent) (unless otherwise indicated), even if it is structurally not identical to the disclosed structure for performing the functions in the exemplary implementation of the present specification shown herein. Moreover, although specific features of the specification have been disclosed with respect to only one of several implementations, such features may be combined with one or more other implementations as may be desired and advantageous for a given or particular application. Furthermore, the terms "comprising," "having," "including," or a variant thereof is used in the detailed description or the claims, such terms are intended to include in a similar manner to the term "comprising."

The above is only a preferred embodiment of the present disclosure. It should be noted that a number of improvements and modifications may be made by those skilled in the art without departing from the principles of the present invention. These improvements and modifications should also be considered as the scope of protection of the present disclosure.

What is claimed is:

1. A liquid crystal display (LCD) device for an under-screen identification scheme, comprising:
   a liquid crystal module comprising an array glass, a liquid crystal layer, a color filter, and a polarizer, wherein the liquid crystal layer, the color filter, and the polarizer are sequentially disposed on the array glass, and the liquid crystal module defines a liquid crystal module operable region and a digging region adjacent to the liquid crystal module operable region;
   a backlight module disposed under the liquid crystal module and emitting light toward the liquid crystal module;
   an under-screen sensor disposed in the backlight module with respect to the digging region of the liquid crystal module; and
   a micro light emitting diode (LED) module disposed in the digging region defined by the liquid crystal module;

wherein the micro LED module defines a micro LED operable region, and the micro LED operable region is adjacent to the liquid crystal module operable region.

2. The LCD device for the under-screen identification scheme as claimed in claim 1, wherein the micro LED module comprises a transparent substrate, a plurality of sub-pixels, and a plurality of chips, and the plurality of sub-pixels and the plurality of chips are disposed on the transparent substrate.

3. The LCD device for the under-screen identification scheme as claimed in claim 2, wherein the chip of the micro LED module has a size ranging from 1 to 500 micrometers (μm), and the sub-pixel of the micro LED module has a size ranging from 10 to 1000 μm.

4. The LCD device for the under-screen identification scheme as claimed in claim 3, wherein a coverage area of each of the chips is smaller than an area of each of the sub-pixels.

5. The LCD device for the under-screen identification scheme as claimed in claim 1, wherein the under-screen sensor comprises one of a fingerprint recognition, a camera, a structured light sensor, a time-of-flight ranging sensor, a distance sensor, and a light sensor.

6. The LCD device for the under-screen identification scheme as claimed in claim 1, wherein the micro LED module utilizes red, green, and blue (RGB) three-color for display.

7. The LCD device for the under-screen identification scheme as claimed in claim 1, wherein the micro LED operable region is disposed at a position comprising one of a hole, a water droplet, a notch, and an outward-facing of the liquid crystal module.

8. The LCD device for the under-screen identification scheme as claimed in claim 7, wherein the area of the micro LED operable region is less than 10*10 mm.

9. The LCD device for the under-screen identification scheme as claimed in claim 8, wherein the substrate of the micro LED module is driven by a passive matrix method or an active matrix method.

10. The LCD device for the under-screen identification scheme as claimed in claim 9, wherein a vertical stack of the micro LED module comprises one of a built-in structure, a surface embedded structure, and a plug-in structure.

* * * * *